under 35 U.S.C. 154(b) by 0 days.

(12) United States Patent
Stahl, Sr. et al.

(10) Patent No.: US 7,685,792 B2
(45) Date of Patent: *Mar. 30, 2010

(54) APPARATUS FOR ENHANCING REINFORCING AND FIRESTOPPING AROUND A DUCT EXTENDING THROUGH A STRUCTURAL PANEL

(75) Inventors: James P. Stahl, Sr., Stockton, NJ (US); James P. Stahl, Jr., Princeton Junction, NJ (US)

(73) Assignee: Specified Technologies Inc., Somerville, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/825,356

(22) Filed: Jul. 6, 2007

(65) Prior Publication Data

US 2007/0261343 A1    Nov. 15, 2007

(51) Int. Cl.
*E04C 2/00* (2006.01)
*E06B 3/968* (2006.01)
*E06B 1/00* (2006.01)

(52) U.S. Cl. .................. 52/656.3; 52/220.8; 52/232; 52/302.6; 52/656.1

(58) Field of Classification Search .............. 52/1, 52/220.8, 232, 219, 58, 60–62, 656.1–656.3, 52/302.6
See application file for complete search history.

(56) References Cited

U.S. PATENT DOCUMENTS

| 4,093,818 A | * | 6/1978 | Thwaites et al. ............ 174/505 |
| 4,183,379 A | | 1/1980 | Marquette et al. |
| 4,464,821 A | | 8/1984 | Haytayan |
| 4,469,018 A | | 9/1984 | Taulman |
| 4,603,517 A | * | 8/1986 | Lyons, Jr. .................... 52/60 |
| 4,616,459 A | | 10/1986 | Shubow |
| 4,885,890 A | | 12/1989 | Deren |
| 4,941,630 A | | 7/1990 | Albano et al. |
| 5,018,333 A | * | 5/1991 | Bruhm ...................... 52/741.4 |
| 5,067,676 A | * | 11/1991 | Beele ........................... 248/56 |
| 5,303,529 A | | 4/1994 | Guardia |
| 5,398,467 A | * | 3/1995 | Ricq et al. .................... 52/232 |
| 5,546,711 A | * | 8/1996 | Heller ....................... 52/167.1 |
| 5,741,390 A | | 4/1998 | Schmuck et al. |
| 5,744,076 A | | 4/1998 | Baxter |
| 5,765,332 A | | 6/1998 | Landin et al. |
| 5,848,509 A | | 12/1998 | Knapp et al. |
| 5,974,750 A | | 11/1999 | Landin et al. |
| 6,105,334 A | * | 8/2000 | Monson et al. ............ 52/741.3 |
| 6,141,929 A | | 11/2000 | Kistner et al. |
| 6,199,326 B1 | * | 3/2001 | Mayle .......................... 52/58 |

(Continued)

*Primary Examiner*—Brian E Glessner
*Assistant Examiner*—Jason Holloway
(74) *Attorney, Agent, or Firm*—Sperry, Zoda & Kane

(57) ABSTRACT

An angular flange for reinforcing and firestopping in the annulus between a structural panel such as a wall, ceiling or floor and a duct extending therethrough. The prefabricated angular flange includes a primary angular flange leg to be secured to the duct and a secondary angular flange leg approximately perpendicularly oriented relative thereto. Each flange includes a sealing member of flexible intumescent paper positionable therealong to facilitate firestopping therebetween. The sealing member preferably including two panels at an obtuse angle with respect to one another and being flexible to become approximately perpendicular with respect to one another responsive to securement of the angular flange to the duct and the surrounding structural panel. One or more uniquely designed corner brackets can be included for mounting the adjacently positioned angular flanges with respect to one another selectively.

16 Claims, 8 Drawing Sheets

U.S. PATENT DOCUMENTS

| | | |
|---|---|---|
| 6,257,282 B1 | 7/2001 | Emmer et al. |
| 6,327,820 B1 * | 12/2001 | Picco .............................. 52/58 |
| 6,358,591 B1 | 3/2002 | Smith |
| 6,401,402 B1 * | 6/2002 | Williams ........................ 52/58 |
| 6,457,279 B1 * | 10/2002 | Jacobsen et al. ................ 52/58 |
| 6,536,169 B2 * | 3/2003 | Dykhoff ..................... 52/220.8 |
| 6,574,932 B2 * | 6/2003 | Layne et al. ............... 52/302.4 |
| 6,754,993 B1 * | 6/2004 | Mayle et al. .................... 52/58 |
| 6,806,212 B2 | 10/2004 | Fyfe |
| 6,820,382 B1 | 11/2004 | Chambers et al. |
| 6,935,379 B1 | 8/2005 | Buchanan, Sr. |
| 6,941,713 B2 * | 9/2005 | Williams ................... 52/302.6 |
| 2006/0042621 A1 * | 3/2006 | Besal ...................... 126/229 D |
| 2006/0070319 A1 * | 4/2006 | Flynn ........................ 52/220.8 |

* cited by examiner

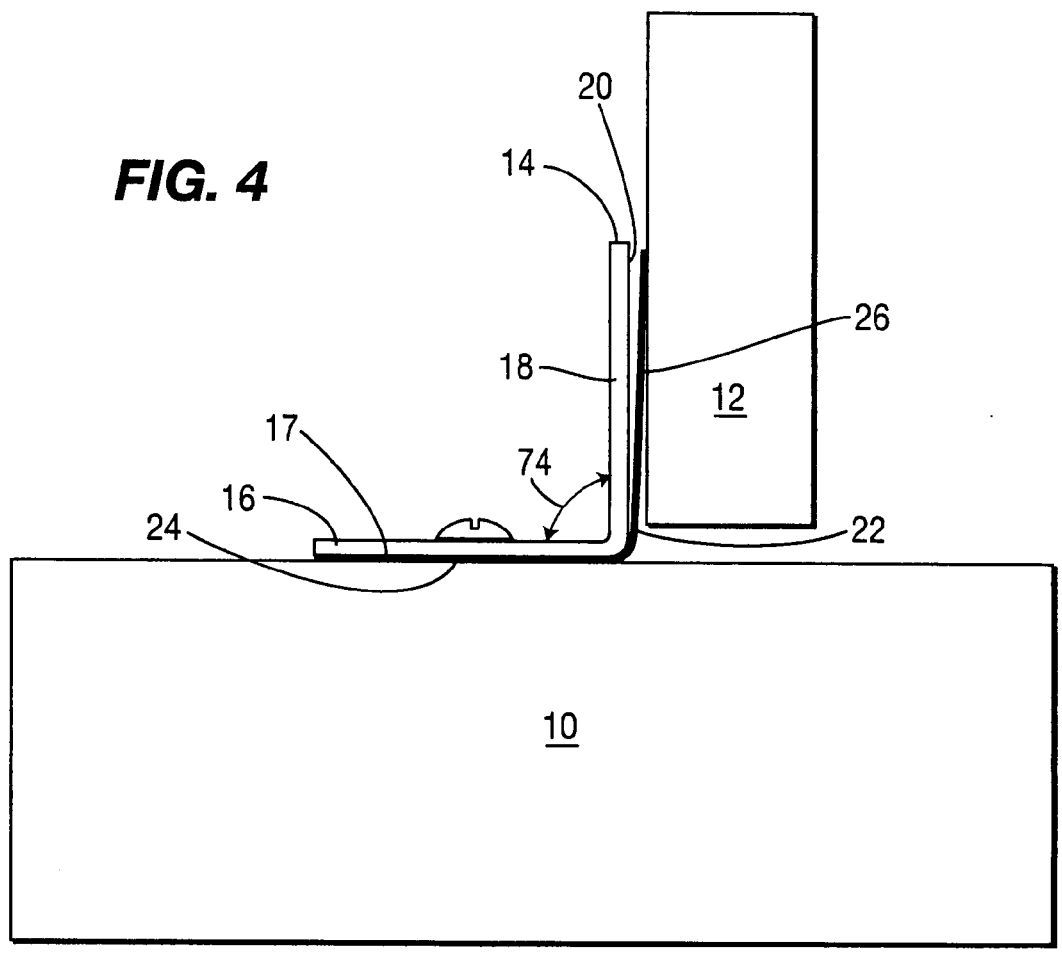
FIG. 4
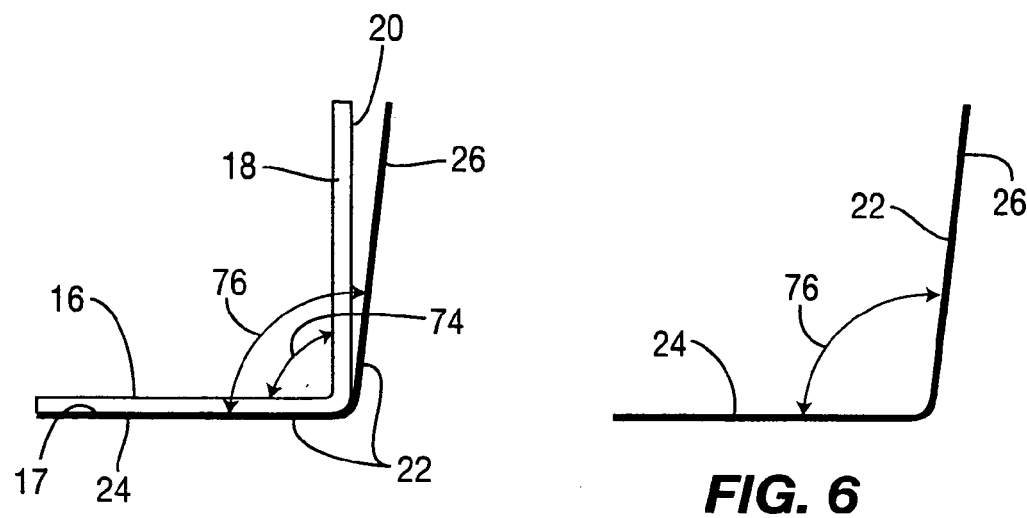
FIG. 5
FIG. 6

US 7,685,792 B2

APPARATUS FOR ENHANCING REINFORCING AND FIRESTOPPING AROUND A DUCT EXTENDING THROUGH A STRUCTURAL PANEL

This application for utility patent application hereby formally claims priority of U.S. Utility patent application Ser. No. 11/432,092 filed May 11, 2006 on "APPARATUS FOR REINFORCING AND FIRESTOPPING AROUND A DUCT EXTENDING THROUGH A STRUCTURAL PANEL" filed by the same inventors listed herein, namely, James P. Stahl, Sr. and James P. Stahl, Jr. and assigned to the same assignee identified herein, namely, Specified Technologies, Inc. which application is currently pending and is hereby formally incorporated by reference as an integral part of the present application.

BACKGROUND OF THE INVENTION

1. Field of the Invention

Generalized ducting is utilized for the purposes of venting, heating and/or air conditioning as well as other applications and purposes such as cabling for computers and the like can provide some difficulty when providing firestopping therearound as they extend or penetrate through structural panels such as walls, floors and ceilings. Whenever the barriers are fire-rated it is necessary that firestopping be provided around such ducts. Some times fire dampers can be installed in line with the air duct at the locations where the ducts penetrate smoke or fire barriers. Often the ducts will pass through the barriers without requiring the placement of fire dampers.

Typically firestopping is provided around such ducts by installing packing material such as mineral wool within the annulus between the duct and the inside of the opening in the structural panel. Some type of a mechanical means such as a bracket or the like is often utilized for maintaining the spacing between the duct and the structural panel in order to maintain the structural integrity of the wall when exposed to fire conditions such as heat or smoke as well as to allow the fireproofing materials to operate properly and effectively seal the annulus when exposed to such fire conditions.

After a duct has been placed extending through a structural wall, ceiling or floor initially fireproofing is applied into the annulus. This fireproofing needs to be inspected by an appropriate government inspector to be sure that it meets local code requirements. Thereafter the mechanical contractor will be required to visit the site to place the flange extending between the duct and the structural panel. Inspection of the fireproofing is not possible after the panel is placed since the annulus is often hidden by the mechanical bracket extending between the duct and the panel.

The present invention provides a prefabricated apparatus which provides a structural bracket for extending between the duct and the structural panel for maintaining spacing therebetween and includes a pre-installed fireproofing seat which can be applied to the surface of the bracket which will be placed adjacent to the annulus for effecting sealing and mechanical connecting between the duct and the surrounding panel simultaneously. As such, this modular concept wherein the fireproofing is preformed at an obtuse angle and is positionable onto a mechanical angle bracket eliminates the necessity of having one skilled technical, namely, fireproofing personnel, apply the fireproofing into the annulus followed by inspection and thereafter having a mechanical contractor place the bracket in place. Use of uniquely designed corner brackets also facilitate on site placement and save time for installation persons. The placement of this modular bracket which includes fireproofing can be placed by the mechanical contractor thereby eliminating the unnecessary placement or insertion step by fireproofing personnel.

2. Description of the Prior Art

Other devices have been utilized for reinforcing and/or firestopping of duct flange such as shown in U.S. Pat. No. 4,183,379 patented Jan. 15, 1980 to R. L. Marquette et al and assigned to Mutz Corp. on a "Duct Board Assembly"; and U.S. Pat. No. 4,464,821 patented Aug. 14, 1984 to H. M. Haytayan and assigned to Pneutek, Inc. on a "Method Of Attaching Insulation To A Mold"; and U.S. Pat. No. 4,469,018 patented Sep. 4, 1984 to N. W. Taulman on an "Energy-Saving Closure For Foundation Vents"; and U.S. Pat. No. 4,616,459 patented Oct. 14, 1986 to C. Shubow on a "Building Construction Using Hollow Core Wall"; and U.S. Pat. No. 4,885,890 patented Dec. 12, 1989 to G. W. Deren and assigned to STEMCOR Corporation on a "Modular Furnace Lining And Hardware System Therefor"; and U.S. Pat. No. 4,941,630 patented Jul. 17, 1990 to J. A. Albano on an "Isolating Pipe Strap For Plumbing Pipes"; and U.S. Pat. No. 5,303,529 patented Apr. 19, 1994 to R. Guardia and assigned to Sap Baustoffe and Bauchemie A G on an "Attachment Of Objects On An Insulation Layer Of Low Mechanical Strength"; and U.S. Pat. No. 5,741,390 patented Apr. 21, 1998 to J. C. Schmuck et al and assigned to Rieter Automotive (International) AG on a "Sound-Insulating Vehicle Body Part"; and U.S. Pat. No. 5,744,076 patented Apr. 28, 1998 to K. I. Baxter on a "Method For Making Insulated Concrete Wall Tie System"; and U.S. Pat. No. 5,765,332 patented Jun. 16, 1998 to H. V. Landin et al and assigned to Minnesota Mining And Manufacturing Company on a "Fire Barrier Protected Dynamic Joint"; and U.S. Pat. No. 5,848,509 patented Dec. 15, 1998 to K. D. Knapp et al and assigned to Certain Teed Corporation on an "Encapsulated Insulation Assembly"; and U.S. Pat. No. 5,974,750 patented Nov. 2, 1999 to H. V. Landin et al and assigned to 3M Innovative Properties Company on a "Fire Barrier Protected Dynamic Joint"; and U.S. Pat. No. 6,141,929 patented Nov. 7, 2000 to M. J. Kistner et al and assigned to Kistner Concrete Products, Inc. on an "Insulated Pre-Formed Wall Panels"; and U.S. Pat. No. 6,257,282 patented Jul. 10, 2001 to C. D. Emmer et al and assigned to MVE, Inc. on a "Vacuum Insulated Pipe"; and U.S. Pat. No. 6,358,591 patented Mar. 19, 2002 to S. S. Smith and assigned to Orcon Corporation on a "Fire-Blocking Insulation Blanket"; and U.S. Pat. No. 6,806,212 patented Oct. 19, 2004 to E. R. Fyfe and assigned to Fyfe Co., LLC on a "Coating And Method For Strengthening A Structure"; and U.S. Pat. No. 6,820,382 patented Nov. 23, 2004 to D. C. Chambers et al and assigned to 3M Innovative Properties Company on a "Fire Stop And Its Use"; and U.S. Pat. No. 6,935,379 patented Aug. 30, 2005 to M. C Buchanan, Sr. on a "Prefabricated Insulation For HVAC Ductwork And Other Fluid Conduits".

SUMMARY OF THE INVENTION

The present invention provides an apparatus for enhancing the reinforcing and firestopping about a duct extending through a structural panel, and includes a primary angular flange which is attachable with respect to a structural panel, and to a duct extending therethrough for the purpose of facilitating firestop sealing around it. The primary angular flange preferably includes a primary flange first let which is positioned extending along the duct at a position adjacent to the structural panel positioned therearound. The primary flange first leg defines a primary flange first leg inner surface attachable with respect to the duct at a position adjacent to the structural panel which normally extends therearound. The primary angular flange further includes a primary flange second leg secured with respect to the primary flange first leg and extending longitudinally therealong, said primary flange second leg defining a primary flange second leg inner surface facing the structural panel extending therearound to facilitate firestop sealing between the structural panel and a duct extending therethrough. The primary flange second leg inner surface of the primary flange second leg is preferably oriented extending approximately perpendicularly outwardly with respect to the primary flange first leg inner surface of the primary flange first leg for the purpose of aiding and the mounting of the primary angular flange adjacent to the structural panel and the duct extending therethrough and for firestop sealing thereadjacent.

The present invention further preferably includes a primary sealing member positioned between the primary angular flange and the duct, and between the primary angular flange and the structural panel for the purpose of aiding firestop sealing therebetween. The primary sealing member preferably includes a primary sealing member first leg section extending over the primary flange first leg inner surface of the primary flange first leg to be positioned between the primary flange first leg inner surface and the duct thereadjacent.

Said primary sealing member further including a primary sealing member second leg section secured with respect to the primary sealing member first leg section and extending longitudinally therealong. The primary sealing member second leg section such that it extends over the primary flange second leg inner surface of the primary flange second leg to be positioned between the primary flange second leg inner surface and the structural panel extending therearound and adjacent to the duct. The primary sealing member second leg section is oriented at an oblique angle with respect to the primary sealing member first leg section responsive to being in the steady state relaxed position. The primary sealing member is of a flexible material to facilitate movement of the primary flange first leg section and the primary flange second leg section to a position approximately perpendicular with respect to one another responsive to attachment of the primary angular flange with respect to the duct and the structural panel.

A secondary angular flange is also included which is attachable with respect to the structural panel and to a duct extending therethrough for facilitating firestop sealing therearound. This secondary angular flange is oriented approximately perpendicularly with respect to the primary angular flange. The secondary angular flange includes a secondary flange first leg positioned extending along the duct at a position adjacent to the structural panel positioned therearound. The secondary flange first leg defines a secondary flange first leg inner surface attachable with respect to the duct at a position adjacent to the structural panel positioned therearound.

The secondary angular flange also includes a secondary flange second leg secured with respect to the secondary flange first leg and extending longitudinally therealong. This secondary flange second leg defines a secondary flange second leg inner surface facing the structural panel extending therearound to facilitate firestop sealing between the structural panel and the duct extending therethrough. The secondary flange second leg inner surface of the secondary flange second leg is oriented extending approximately perpendicularly outwardly with respect to the secondary flange first leg inner surface of the secondary flange first leg to facilitate mounting of the secondary angular flange adjacent the structural panel and the duct extending therethrough to facilitate firestop sealing.

A secondary sealing member is also included positioned between the secondary angular flange and the duct, as well as between the secondary angular flange and the structural panel for sealing therearound. The secondary sealing member includes a secondary sealing member first leg section extending over the secondary flange first leg inner surface of the secondary flange first leg in order to be positioned between the secondary flange first leg inner surface and the duct thereadjacent. A secondary sealing member second leg section is also included within the construction of the secondary sealing member, and it is secured with respect to the secondary sealing member first leg section and extends longitudinally therealong. This secondary sealing member second leg section extends over the secondary flange second leg inner surface of the secondary flange second leg to be positioned between the secondary flange second leg inner surface and the structural panel extending therearound, as well as adjacent the duct. The secondary sealing member second leg section is oriented at an oblique angle with respect to the secondary sealing member first section responsive to being in the steady state relaxed position. On the other hand, the secondary sealing member is of a flexible material sufficiently flexible to facilitate movement of the secondary flange first leg section and the secondary flange second leg section to a position approximately perpendicular with respect to one another responsive to attachment of the secondary angular flange with respect to the duct and the surrounding structural panel.

The apparatus further includes a corner bracket securable with respect to the primary angular flange and the secondary angular flange to facilitate securement therebetween and sealing between the duct and the surrounding panel. Each such corner bracket includes a first corner panel attachable with respect to the secondary flange first leg of the secondary flange. The first corner panel defines a first corner securement aperture extending therethrough. The corner bracket also includes a second corner panel attachable with respect to the primary flange first leg of the primary angular flange. The second corner panel also includes a C-shaped section defining a securement channel therewithin. This C-shaped section is adapted to extend around the primary flange first leg in such a manner that the securement channel defined therein is adapted to receive the primary flange first leg extending therewithin for retaining it. The second corner panel defines a second corner securement aperture therein. The corner bracket further defines a corner slot extending between the first corner panel and the second corner panel preferably to facilitate adjustable flexibility therebetween to facilitate securement of the first corner panel with respect to the secondary angular flange, and securement of the second corner panel with respect to the primary angular flange.

The corner bracket further includes a third corner panel positionable in abutment with respect to the secondary flange second leg of the secondary angular flange. This third corner panel includes marking indicia displayed thereupon pointing toward the first corner panel to indicate that the duct should be positioned adjacent the secondary flange first leg inner surface of the secondary flange first leg positioned adjacent the first corner panel. The corner bracket further includes a first corner panel threaded securement means such as a screw or the like, which is adapted to extend through the first corner securement aperture into engagement with the secondary flange first leg located thereadjacent. Also included is a second corner panel threaded securement device such as a screw means, which is adapted to extend through the second corner securement aperture means into engagement with respect to the primary flange first leg thereadjacent.

It should be appreciated that the present invention can include multiple individual primary and secondary flanges. In the most common configuration, two primary flange configurations and two secondary flange configuration will be included, such that the secondary angular flanges are positioned parallel to one another and extending between a pair of primary angular flanges. This defines an overall square configuration.

It is also preferable that the primary angular flange include a primary flange first extended section extending outwardly therefrom away from the duct and along the structural panel. In this manner, the corner bracket can be securable thereto to facilitate securement thereof with respect to the primary angular flange. It is also preferable that the corner brackets and flanges of the present invention be made of a metallic material, preferably steel, to facilitate reliability and enhance the overall strength thereof.

It is an object of the present invention to provide an apparatus for reinforcing and firestopping around a duct extending through a structural panel wherein staging of the steps of firestopping placement and mechanical bracket attachment is eliminated.

It is an object of the present invention to provide an apparatus for reinforcing and firestopping around a duct extending through a structural panel wherein a modular apparatus can be provided for simultaneously attaching a mechanical bracket between the duct and the structural panel therearound and firestop sealing of the space or annulus located therebetween.

It is an object of the present invention to provide an apparatus for reinforcing and firestopping around a duct extending through a structural panel which is easily maintained.

It is an object of the present invention to provide an apparatus for reinforcing and firestopping around a duct extending through a structural panel which can be easily replaced in a modular manner when needed.

It is an object of the present invention to provide an apparatus for reinforcing and firestopping around a duct extending through a structural panel which allows firestopping to be placed in an annulus between a duct and a surrounding wall panel by a mechanical contractor simultaneously with placing of a structural mechanical bracket extending therebetween.

It is an object of the present invention to provide an apparatus for reinforcing and firestopping around a duct extending through a structural panel which can eliminate staged inspections by local building code authorities.

It is an object of the present invention to provide an apparatus for reinforcing and firestopping around a duct extending through a structural panel which is much easier and convenient to place than the use of caulking and/or mineral wool in the space between a duct and a surrounding structural panel.

It is an object of the present invention to provide an apparatus for reinforcing and firestopping around a duct extending through a structural panel which is adjustable in positioning to vary the spacing between the second flange leg of the annular flange and the structural panel.

It is an object of the present invention to provide an apparatus for reinforcing and firestopping around a duct extending through a structural panel which can be provided with a flexibly resilient paper or foam firestopping material which is fireproof and, as such, resistant to the flow of smoke and heat thereby.

It is an object of the present invention to provide an apparatus for reinforcing and firestopping around a duct extending through a structural pane which can optionally be constructed with intumescent firestopping material.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 4 is a side cross sectional view of an embodiment of a primary angular flange and a primary sealing member positioned thereunder while being secured with respect to a structural surface and a duct;

FIG. 5 is an illustration of an embodiment of an angular flange with the legs thereof approximately perpendicular with respect to one another shown positioned in abutment with an embodiment of the sealing member with the leg sections thereof oriented at an obtuse angle relative to one another;

FIG. 6 is a side plan view of an embodiment of the sealing member of the present invention shown in the relaxed position with the legs oriented at an obtuse angle relative to one another;

DETAILED DESCRIPTION OF THE PREFERRED EMBODIMENT

Figure 1:
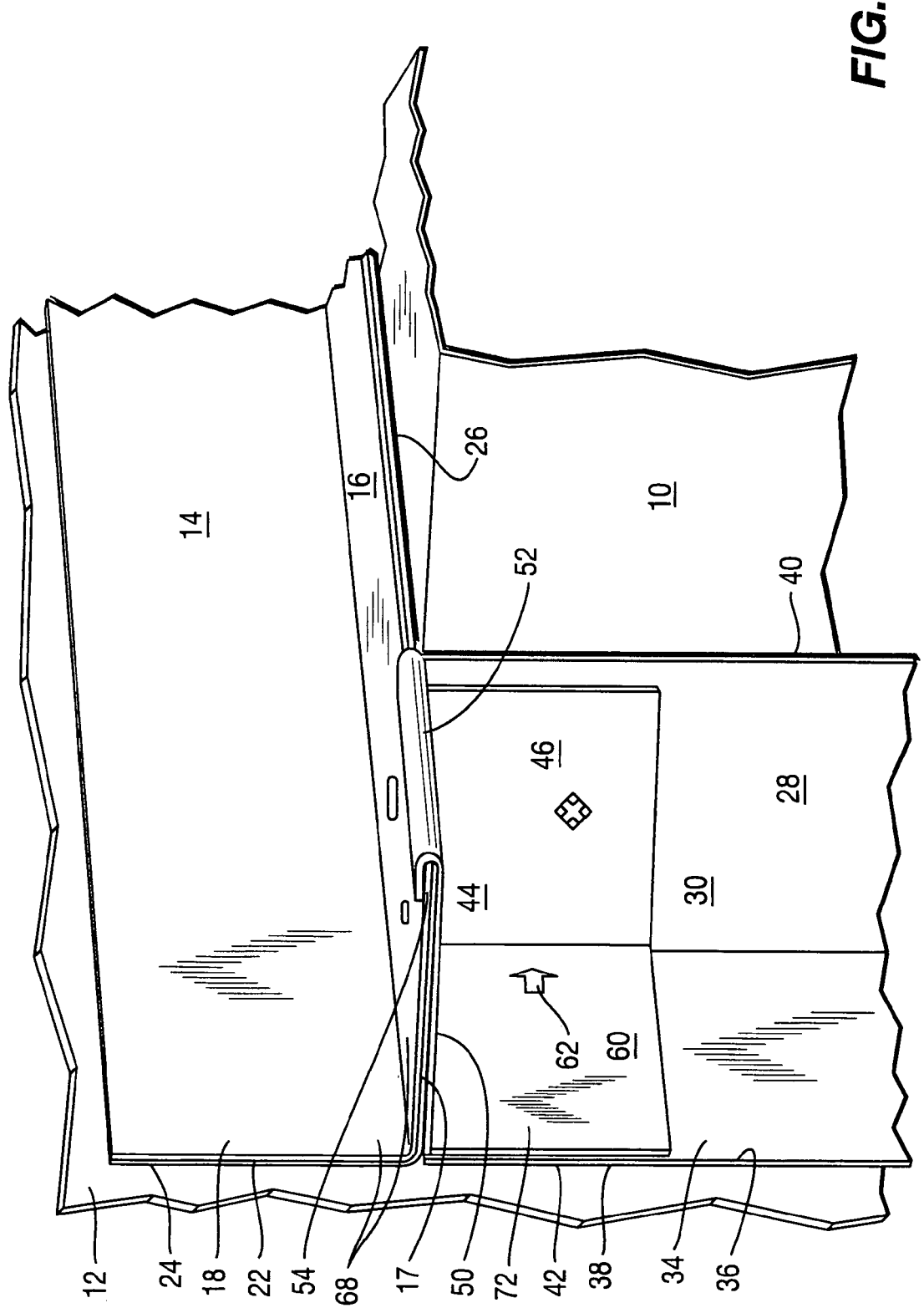
FIG. 1 is a perspective illustration of an embodiment of the present invention showing a corner bracket connecting a primary angular flange with respect to a secondary angular flange.

An apparatus is disclosed herein which reinforces and firestops between a duct 10 and a structural panel 12 through which duct 10 extends. Such ducts are commonly required for heating, ventilating and air conditioning as well as other purposes and will be positioned extending through various structural panels 12 such as walls, floors and/or ceilings in residential as well as commercial buildings. When these structural panels 12 are fire rated, it is necessary that firestopping be provided in the space or annulus immediately surrounding such ducts 10 between the exterior surface of the duct and the interior edge of the structural barrier panel 12. Ducts 10 are usually made of a metallic material such as steel but can be made of any material capable of being formed into the shape of a conduit.

Whenever such a structural barrier or panel 12 is fire rated it is necessary that some type of firestopping seal be placed in this annulus between the panel and the penetrating item. This firestopping process normally requires a two-step operation wherein initially firestopping material is placed into the annulus. Such firestopping material can be various combinations of caulking and/or mineral wool or other firestopping materials. Thereafter a structural bracket can be positioned extending between the duct 10 and the structural panel 12 for maintaining the integrity of the structural strength therebetween and for maintaining the spacing and other dimensions especially when subjected to fire conditions such as heat and smoke. The present invention provides a unique modular pre-fabricated apparatus normally formed of a plurality of individual angular flanges such as primary angular flanges 14 and secondary angular flanges 28. Each of these flanges are normally made of a metallic material such as steel or the like, and are defined by individual legs extending outwardly therefrom approximately perpendicular with respect to one another.

In particular, in the present invention the primary angular flange 14 normally includes a primary flange first leg 16 extending outwardly adjacent to the external surface of a duct 10 such as to be capable of being attached thereto for sealing thereadjacent. The primary angular flange 14 preferably also includes a primary flange second leg 18 fixedly secured with respect to the primary flange first leg 16, and extending therealong at an orientation of approximately 90 degrees relative thereto. The primary flange second leg 18 is preferably mountable with respect to the structural panel 12 which surrounds the duct 10.

Preferably the primary flange first leg 16 defines a primary flange first leg inner surface 17 adapted to be facing in the direction of the duct 10 to facilitate securement with respect thereto. Similarly the primary flange second leg 18 will preferably define a primary flange second leg inner surface 20 positionable adjacent to the structural panel 12 surrounding the duct 10 to facilitate securement with respect thereto.

To facilitate sealing between the primary angular flange 14 and the duct 10 and structural panel 12, a primary sealing member 22 is preferably included. The sealing member can be made of any type of material, but preferably is made of an intumescent paper material which is preformed with an obtuse angle between the two legs thereof. The primary sealing member 22 preferably defines a primary sealing member first leg section 24 positionable between the primary flange first leg inner surface 17 and the duct 10 for sealing between the primary flange first leg 16 and duct 10. Similarly, a primary sealing member second leg section 26 is included in the structure of the primary sealing member 22 which is adapted to be positioned between the primary flange second leg inner surface 20 and the structural panel 12.

As such, the overall configuration of the primary angular flange 14 provides the first leg 16 and the second leg 18 thereof oriented at approximately 90 degrees with respect to one another. It should be appreciated that the primary angular flange 14 is made of a steel or metal material, and as such, has limited flexibility and therefore maintains this angle. On the other hand however, the primary sealing member 22 includes the first leg section 24 and the second leg section 26 thereof in the steady state position preformed at an obtuse angle relative to one another. Other than the difference in these angles, the overall general shape of the primary angular flange 14 and the primary sealing member 22 are quite similar. Preferably the obtuse angle between the primary sealing member first leg section 24, and the primary sealing member second leg section 26 is between 90 and 180 degrees, but normally is preferably slightly greater than 90 degrees, more particularly in the area of between 100 degrees and 145 degrees. This obtuse sealing member angle is shown as reference numeral 76. The general perpendicular orientation between the first and second legs 16 and 18 of the primary angular flange 14 is referenced as flange leg angle 74 in the drawings.

With this construction, when the fixedly configured primary angular flange 14 is secured to the duct 10 and to the structural panel 12, the primary sealing member 22 will be urged to change to the configuration wherein the first leg section and second leg sections 24 and 26 thereof, respectively, become perpendicular with respect to one another. This deforming of the intumescent paper of the primary sealing member 22 into the relative perpendicular configuration between the respective legs thereof, is best shown in FIGS. 4, 5 and 6. FIG. 6 shows the primary sealing member 22 with the first and second leg sections 24 and 26 thereof initially in the steady state position extending outwardly at an obtuse sealing member angle 76 relative to one another. This sealing means is then placed in abutment with respect to the steel primary angular flange 14 as shown in FIG. 5. When the primary flange first leg 16 and the primary flange second leg 18 are secured with respect to the duct 10 and structural panel 12, respectively, the primary sealing member 22, which is of a flexible material such as intumescent paper, will be urged to move toward a similar perpendicular orientation to that of the legs of the primary angular flange 14 as shown best in FIG. 4. In this manner, the flexibility of the primary sealing member 22 will facilitate sealing along various configurations of ducts 10 and structural panels 12. Such ducts and panels tend to be very similar in configuration or smoothness, and this intumescent sealing member facilitates intumescent sealing along most configurations of ducts 10 and along most configurations of structural panels 12 to effectively provide firestopping in the annular region therebetween.

Figure 2:
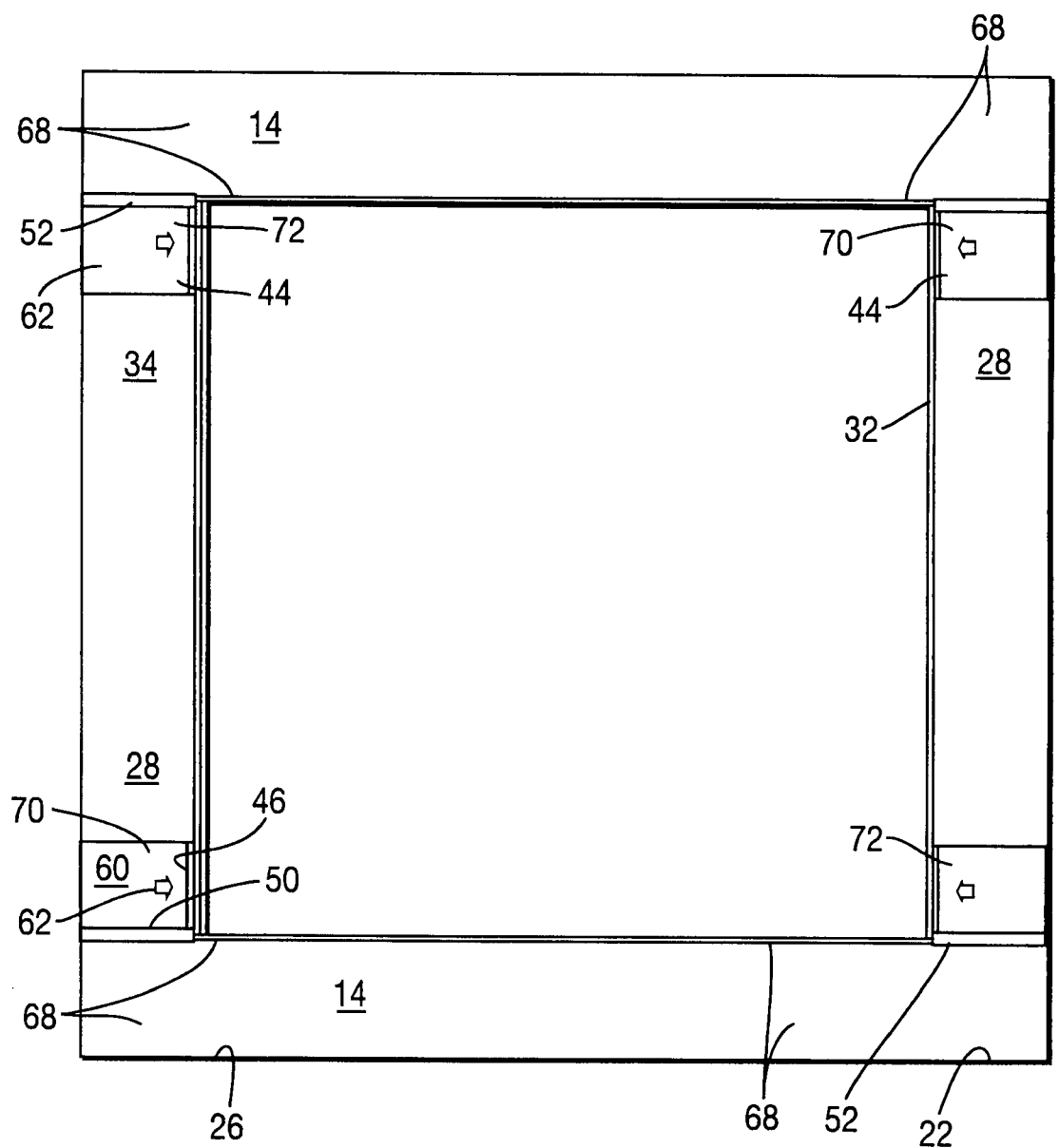
FIG. 2 is a front plan view of an embodiment of the present invention having a square configuration utilizing two primary angular flanges with two secondary angular flanges positioned therebetween and four corner brackets positioned about a square duct extending through a structural panel.
Figure 3:
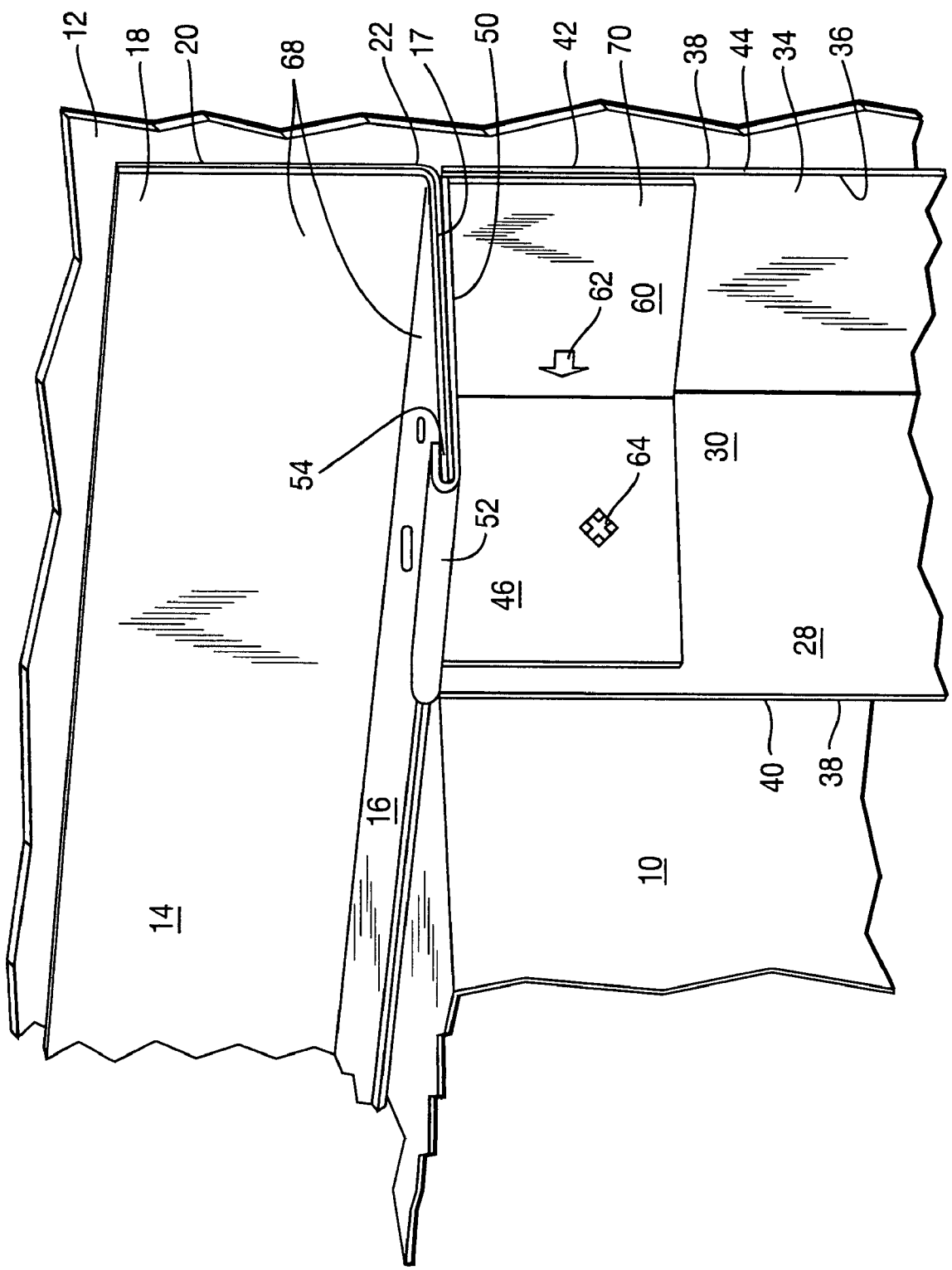
FIG. 3 is an illustration of the embodiment shown in FIG. 2 showing an exploded view of the upper right portion in perspective of the present invention.
Figure 7:
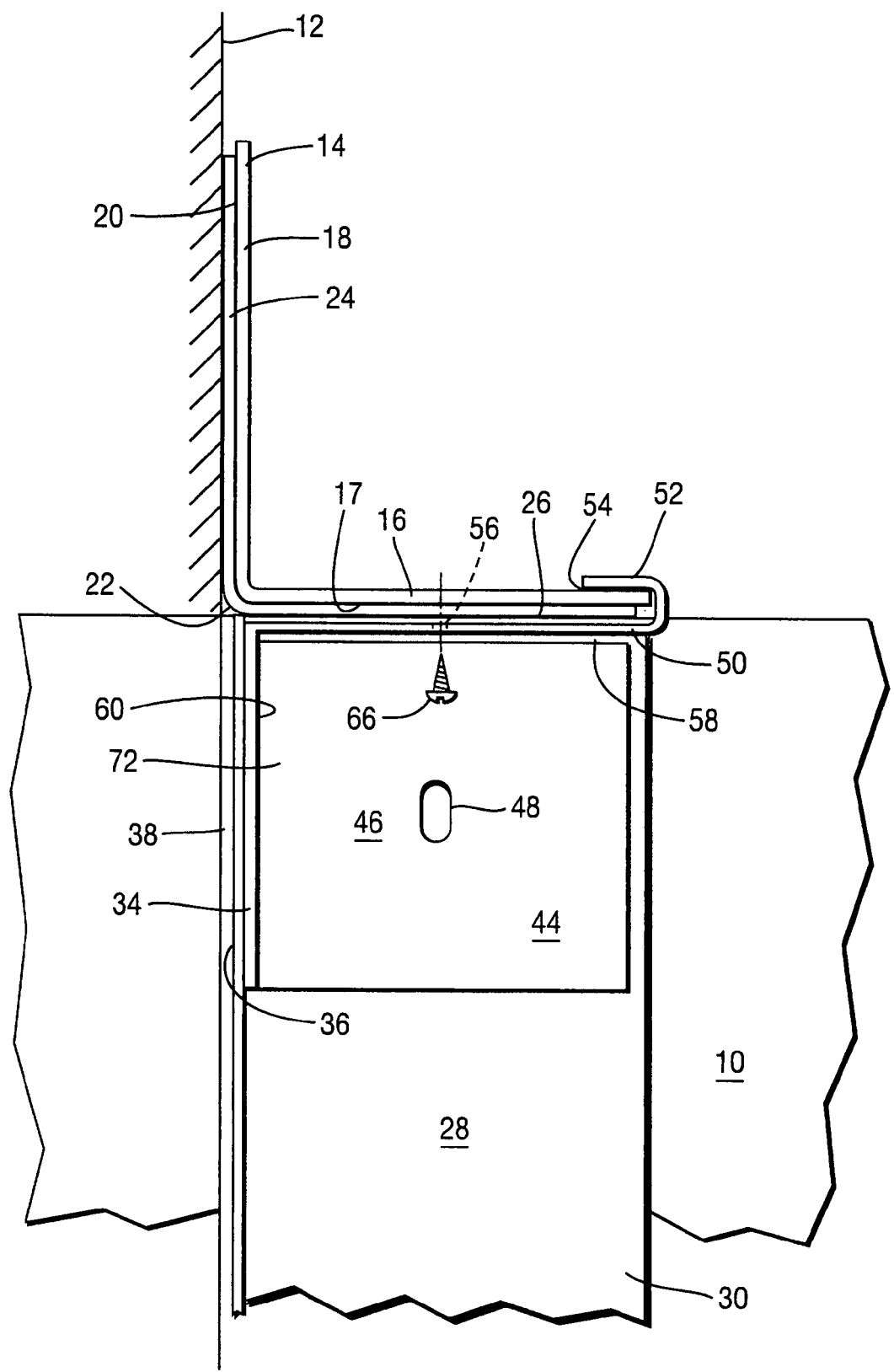
FIG. 7 is a side cross sectional view of an embodiment of the corner member having a B configuration shown in position.
Figure 8:
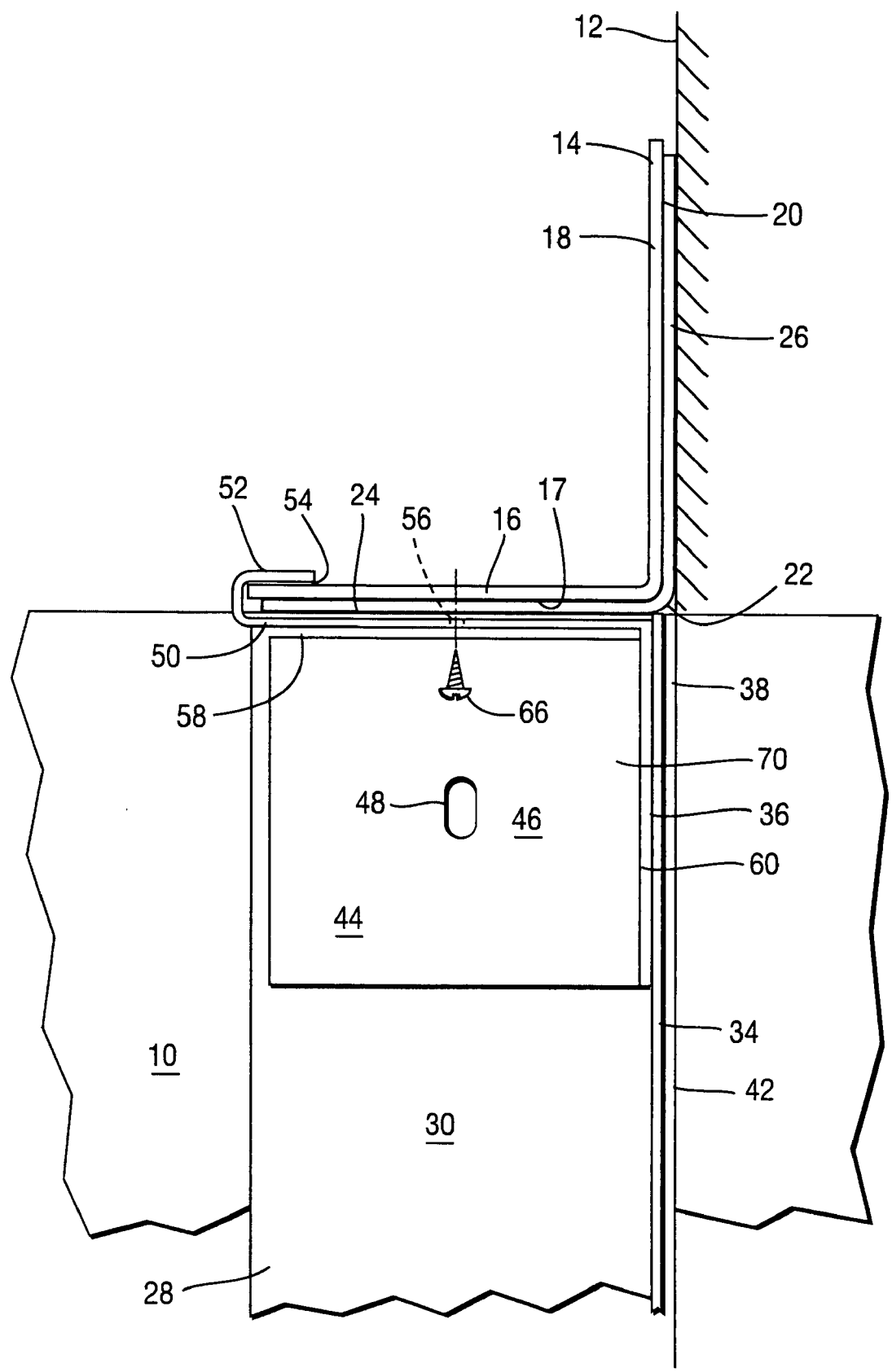
FIG. 8 is a side cross sectional view of an embodiment of the corner member having an A configuration shown in position.
Figure 9:
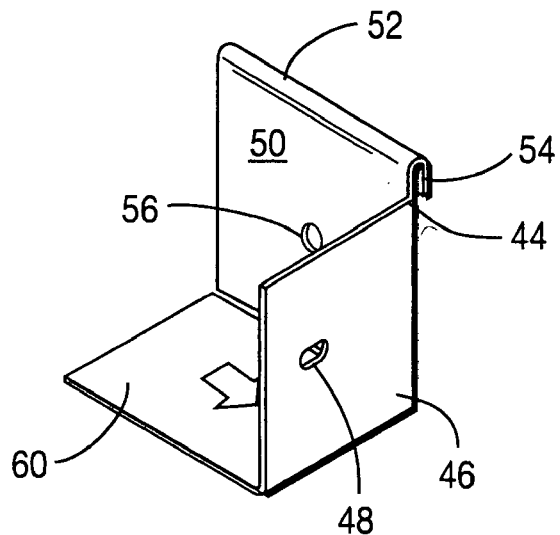
FIG. 9 is a perspective illustration of an embodiment of the B configuration of the corner clamp of the present invention.
Figure 10:
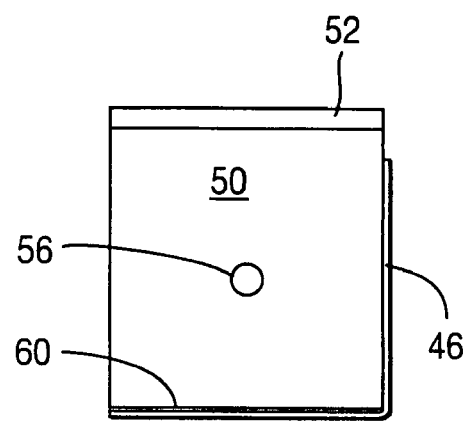
FIG. 10 is a left plan view of the embodiment shown in FIG. 9.
Figure 11:
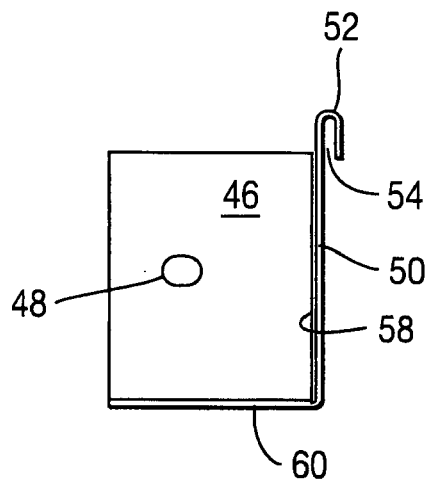
FIG. 11 is a right plan view of the embodiment shown in FIG. 9.
Figure 12:
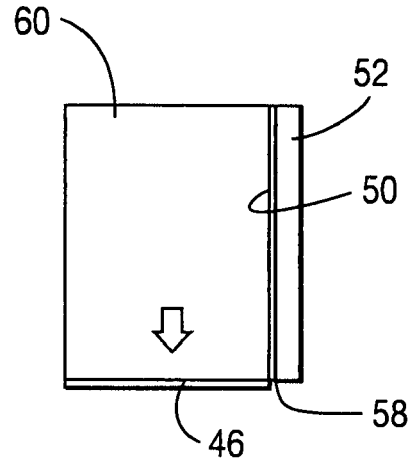
FIG. 12 is a top plan view of the embodiment shown in FIG. 9.
Figure 13:
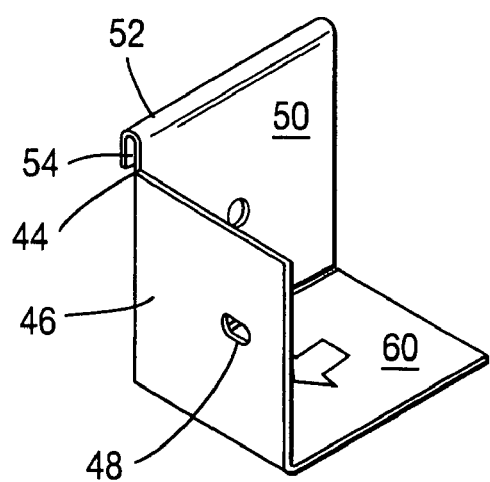
FIG. 13 is a perspective illustration of an embodiment of the A configuration of a corner bracket.
Figure 14:
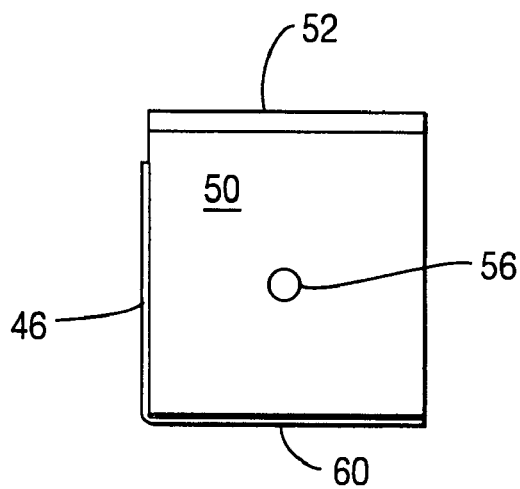
FIG. 14 is a right side plan view of the embodiment shown in FIG. 13.
Figure 15:
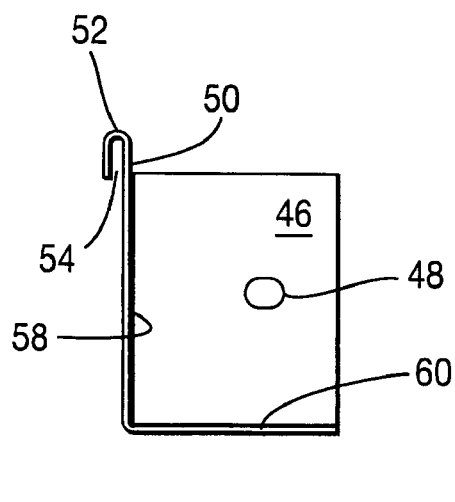
FIG. 15 is a left side plan view of the embodiment shown in FIG. 13.
Figure 16:
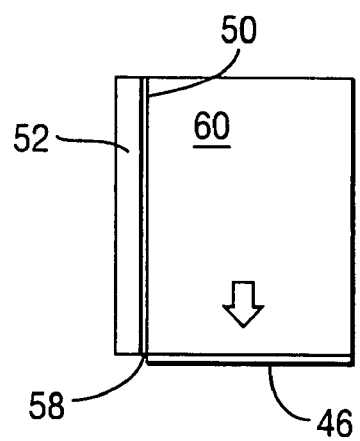
FIG. 16 is a top plan view of the embodiment shown in FIG. 13.

In most configurations the duct 10 is either square or rectangular, and as such, requires four particular angular flanges to completely seal therearound. In this configuration, it is preferable to provide two different types of angular flanges. One angular flange is similar to that described above, namely the primary angular flange 14. An alternative construction is for a second angular flange 28 as shown best in FIGS. 1, 2 and 3. The secondary angular flange 28 is quite similar to the configuration of the primary angular flange 14. However, normally the second angular flange is run perpendicular thereto. As shown in FIG. 2, a conventional square or rectangular duct 10 can be sealed by the inclusion of two primary angular flanges 14 and two secondary angular flanges 28. Each of the two primary angular flanges 14 will extend parallel to one another on opposite sides of the duct 10 and to secondary angular flanges 28 will extend parallel with respect to one another on the other opposite two sides of the duct 10. Thus, each primary angular flange 14 will be positioned between two adjacently positioned and approximately perpendicularly oriented secondary angular flanges 28.

Each secondary angular flange 28 will be similar in configuration to the primary angular flange 14 and will include a secondary flange first leg 30, and a secondary flange second leg 34 oriented approximately perpendicularly longitudinally therealong. The secondary flange first leg 30 will define a secondary flange first leg inner surface 32 positionable immediately adjacent duct 10. The secondary flange second leg 36 will include a secondary flange second leg inner surface 36 adapted to be positioned adjacent to the structural panel 12. A secondary sealing member 38 will be included having a secondary sealing member first leg section 40 and a secondary sealing member second leg section 42. In a steady state position, the secondary flange first leg 30 will be approximately perpendicularly oriented with respect to the secondary flange first leg inner surface 32. In the steady state position however, the secondary sealing member first leg section 40 will be oriented at an obtuse angle relative to the secondary sealing member second leg section 42.

The mounting of the secondary angular flange 20 with respect to the duct 10 and the structural panel 12 will be similar to that described above for the primary angular flange 14. That is, the perpendicular in nature of the normally steel secondary angular flange 28 will cause the relative obtuse angle between the secondary sealing member first leg section 40 and the secondary sealing member second leg section 42, to move from the obtuse angle therebetween, to a generally perpendicular orientation therebetween responsive to securement of the secondary angular flange 28 with respect to the duct 10.

One of the unique aspects of the present invention is the inclusion of a unique configuration for a corner bracket 44 adapted to secure the legs of the primary angular flange 14 relative to the legs of the secondary angular flange 28. In the preferred configuration, the corner bracket 44 will include a first corner panel 46, and a second corner panel 50, and a third coiner panel 60. Each of these corner panels is perpendicularly oriented to both other panels.

With this configuration, the first corner panel 46 will preferably include a first corner securement aperture means 48. To facilitate securement of the first corner panel 46 relative to the secondary flange first leg 30 of the secondary angular flange 28. This securement is facilitated by the inclusion of a first corner securement aperture means 48 defined within the first corner panel 46. A first corner panel threaded securement means 64, such as a sheet metal screw or the like, may be positionable extending through the first corner securement aperture means 48, into engagement with the secondary flange first leg 30 of the secondary angular flange 28 positioned therebelow. In this manner from securement between the first corner panel 46 and the secondary angular flange 28 is achievable.

The second corner panel 50 is mountable with respect to the primary flange first leg 16 of the primary angular flange 14. This securement is preferably achievable by providing the second corner panel 50 with a C-shaped section 52 defining a securement channel 54 extending therealong. Securement channel 54 is adapted to receive the primary flange first leg 16 thereinto for securement of the second corner panel 50 with respect to the primary angular flange 14. Additional securement can be provided by the defining of a second corner securement aperture 56 within the second corner panel 50. This second corner securement aperture 56 is defined to be capable of receiving a second corner panel threaded securement means 66, such as a sheet metal screw or the like extending therethrough to further fixedly secure the second corner panel 50 with respect to the primary flange first leg 16 of the primary angular flange 14. It should be appreciated that the added securement of the second corner panel threaded securement means 66 extending through the second corner securement aperture 56, may not be needed because of the engagement provided between the second corner panel 50 and the primary angular flange 14 by the C-shaped section 52, and the securement channel 54 defined therein. However, the possibility of inclusion of a second more redundant means for securement of the second coiner panel 50 relative to the primary angular flange 14 is sometimes deemed to be needed.

Furthermore, it should be appreciated that the primary difference between the configuration of the primary angular flange 14 and the secondary angular flange 28, is that the primary angular flange 14 will preferably include primary flange first extended sections 68. These sections extend beyond the specific dimensions of the duct 10 as shown best in FIGS. 1 and 3. The securement between the primary angular flange 14 and a secondary angular flange 28 by a corner bracket 44 is best achieved by providing these primary angular flanges 14 with extended section 68 which extend beyond the specific dimensions of the duct 10.

Each corner bracket 44 also includes a third corner panel 60 which is adapted to exert force against the secondary flange second leg 34 to urge it to provide sealing against the structural panel 12 therebeneath. Thus, the three individual panels 46, 50 and 60 of the corner bracket 44, are adapted to firmly maintain the interlocking configuration between adjacently positioned portions of the primary angular flange 14 and the secondary angular flange 28. The third corner panel 60 preferably includes marking indicia 62 thereon, which preferably includes the word duct and an arrow to facilitate and enhance the capabilities of installation personnel, in properly positioning and orienting the corner brackets 44 for fixedly securing adjacent angular flanges relative to one another. Some flexibility in the orientation of the first corner panel 46 relative to the second corner panel 50 needs to be provided to account for various different dimensions and configurations of ducts 10, structural panels 12 and angular flanges 14 and 28, and for this purpose a corner slot means 58 is preferably defined in each of the corner brackets 44 extending along the entire length between the first corner panel 46, and the second corner panel 50.

With the configuration shown in FIG. 2, two primary angular flanges 14 will be positioned extending generally horizontally, and two secondary angular flanges 28 will be positioned extending generally vertically between the pair of primary angular flanges 14. With this configuration, it is preferable to include two different configurations of corner brackets 14. It should be appreciated that two different configurations is not necessary, and the present invention can certainly be practiced in a fully enabling manner with a single configuration, as long as it includes the three basic panels as described herein however, two separate configurations are preferable. The initial corner configuration A shown by reference numeral 70 is shown in FIG. 1 and FIGS. 13 through 16. The alternative configuration, which is corner configuration B shown as reference numeral 72 is shown in FIG. 3 and FIGS. 9 through 12. It should be appreciated that these two configurations are direct mirror images of one another, and are disclosed herein only for the purposes of further enabling the present invention be practiced. As shown in FIG. 2, when a conventional configuration of a duct 10 is utilized, which is generally rectangular and two primary angular flanges 14 and two secondary angular flanges 28 are included, it will be preferable to include corner brackets 44 of the A configuration and two corner brackets 44 of the B configuration. This has been shown to be the most convenient configuration for facilitating reliability of installation by installation personnel. However, the overall design of the present invention can certainly be practiced by the inclusion of a single configuration of the corner bracket 44 such that it includes the basic three corner panels 46, 50 and 60 as described herewithin.

While particular embodiments of this invention have been shown in the drawings and described above, it will be apparent that many changes may be made in the form, arrangement and positioning of the various elements of the combination. In consideration thereof, it should be understood that preferred embodiments of this invention disclosed herein are intended to be illustrative only and not intended to limit the scope of the invention.

We claim:

1. An apparatus for enhancing reinforcing and firestopping around a duct extending perpendicularly through a structural panel comprising:
   A. an angular flange means attachable with respect to a structural panel and to a duct extending perpendicularly therethrough for facilitating firestop sealing therearound, said angular flange means including:
      (1) a first flange leg positioned extending along the duct at a position adjacent to the structural panel positioned therearound, said first flange leg defining an inner first leg surface attachable with respect to the duct at a position adjacent to the structural panel positioned therearound;
      (2) a second flange leg secured with respect to said first flange leg and extending longitudinally therealong, said second flange leg defining an inner second leg surface facing the structural panel extending therearound to facilitate firestop sealing between the structural panel and a duct extending therethrough, said inner second leg surface of said second flange leg being oriented extending approximately perpendicularly outwardly with respect to said inner first leg surface of said first flange leg to facilitate attachment of said angular flange means to the structural panel and to the duct extending therethrough and for facilitating firestop sealing therebetween; and
   B. a sealing member positioned between said angular flange means and the duct and between said angular flange means and the structural panel for facilitating sealing therebetween, said sealing member including:
      (1) a first sealing member leg extending over said inner first leg surface of said first flange leg to be positioned between said inner first leg surface of said first flange leg and the duct thereadjacent extending perpendicularly through the structural panel;
      (2) a second sealing member leg secured with respect to said first sealing member leg and extending longitudinally therealong, said second sealing member leg extending over said inner second leg surface of said second flange leg to be positioned between said inner second leg surface of said second flange leg and the structural panel surrounding the duct extending perpendicularly therethrough, said second sealing member leg being oriented at an oblique angle of greater than ninety degrees and less than 180 degrees with respect to said first sealing member leg, said sealing member being of a flexible material to facilitate flexible movement of said first sealing member leg and said second sealing member leg from an oblique angle orientation to approximately a perpendicular angle with respect to one another responsive to attachment of said first flange leg with respect to the duct and attachment of said second flange leg with respect to the structural panel due to the perpendicular orientation of said first flange leg with respect to said second flange leg and due to the perpendicular orientation of the structural panel with respect to the duct extending therethrough.

2. An apparatus for enhancing reinforcing and firestopping around a duct extending perpendicularly through a structural panel as defined in claim 1 wherein said sealing member is made of a intumescent paper material.

3. An apparatus for enhancing reinforcing and firestopping around a duct extending perpendicularly through a structural panel as defined in claim 1 wherein said angular flange means is made of metal.

4. An apparatus for enhancing reinforcing and firestopping around a duct extending perpendicularly through a structural panel comprising:
   A. a primary angular flange attachable with respect to a structural panel and to a duct extending perpendicularly therethrough for facilitating firestop sealing therearound, said primary angular flange including:
      (1) a primary flange first leg positioned extending along the duct at a position adjacent to the structural panel positioned therearound, said primary flange first leg defining a primary flange first leg inner surface attachable with respect to the duct at a position adjacent to the structural panel positioned therearound;
      (2) a primary flange second leg secured with respect to said primary flange first leg and extending longitudinally therealong, said primary flange second leg defining a primary flange second leg inner surface facing the structural panel extending therearound to facilitate firestop sealing between the structural panel and a duct extending therethrough, said primary flange second leg inner surface of said primary flange second leg being oriented extending approximately perpendicularly outwardly with respect to said primary flange first leg inner surface of said primary flange first leg to facilitate mounting of said primary angular flange adjacent the structural panel and the duct extending therethrough and for facilitating firestop sealing therebetween;
   B. a primary sealing member positioned between said primary angular flange and the duct and between said primary angular flange and the structural panel for facilitating sealing therebetween, said primary sealing member including:
      (1) a primary sealing member first leg section extending over said primary flange first leg inner surface of said primary flange first leg to be positioned between said primary flange first leg inner surface and the duct thereadjacent extending perpendicularly through the structural panel;
      (2) a primary sealing member second leg section secured with respect to said primary sealing member first leg section and extending longitudinally therealong, said primary sealing member second leg section extending over said a primary flange second leg inner surface of said primary flange second leg to be positioned between said primary flange second leg inner surface and the structural panel surrounding the duct extending perpendicularly therethrough, said primary sealing member second leg section being oriented at an oblique angle greater than 90 degrees and less than 180 degrees with respect to said primary sealing member first leg section, said primary sealing member being of a flexible material to facilitate flexible movement of said primary sealing member first leg section and said primary sealing member second leg section to an orientation approximately perpendicular with respect to one another due to the perpendicular orientation of said primary flange first leg with respect to said primary flange second leg and due to the perpendicular orientation of the structural panel with respect to the duct extending therethrough;

C. a secondary angular flange attachable with respect to a structural panel and to a duct extending perpendicularly therethrough for facilitating firestop sealing therearound, said secondary angular flange including:
   (1) a secondary flange first leg positioned extending along the duct at a position adjacent to the structural panel positioned therearound, said secondary flange first leg defining a secondary flange first leg inner surface attachable with respect to the duct at a position adjacent to the structural panel positioned therearound;
   (2) a secondary flange second leg secured with respect to said secondary flange first leg and extending longitudinally therealong, said secondary flange second leg defining a secondary flange second leg inner surface facing the structural panel extending therearound to facilitate firestop sealing between the structural panel and a duct extending therethrough, said secondary flange second leg inner surface of said secondary flange second leg being oriented extending approximately perpendicularly outwardly with respect to said secondary flange first leg inner surface of said secondary flange first leg to facilitate mounting of said secondary angular flange adjacent the structural panel and the duct extending therethrough and for facilitating firestop sealing therebetween;

D. a secondary sealing member positioned between said secondary angular flange and the duct and between said secondary angular flange and the structural panel for facilitating sealing therebetween, said secondary sealing member including:
   (1) a secondary sealing member first leg section extending over said secondary flange first leg inner surface of said secondary flange first leg to be positioned between said secondary flange first leg inner surface and the duct thereadjacent extending perpendicularly through the structural panel; and
   (2) a secondary sealing member second leg section secured with respect to said secondary sealing member first leg section and extending longitudinally therealong, said secondary sealing member second leg section extending over said a secondary flange second leg inner surface of said secondary flange second leg to be positioned between said secondary flange second leg inner surface and the structural panel surrounding the duct extending perpendicularly therethrough, said secondary sealing member second leg section being oriented at an oblique angle greater than 90 degrees and less than 180 degrees with respect to said secondary sealing member first leg section, said secondary sealing member being of a flexible material to facilitate flexible movement of said secondary sealing member first leg section and said secondary sealing member second leg section to an orientation approximately perpendicular with respect to one another due to the perpendicular orientation of said secondary flange first leg with respect to said secondary flange second leg and due to the perpendicular orientation of the structural panel with respect to the duct extending therethrough.

5. An apparatus for enhancing reinforcing and firestopping around a duct extending perpendicularly through a structural panel as defined in claim 4 further comprising a corner bracket means securable with respect to said primary angular flange and said secondary angular flange to facilitate securement therebetween and sealing thereof against the duct and surrounding panel.

6. An apparatus for enhancing reinforcing and firestopping around a duct extending perpendicularly through a structural panel as defined in claim 5 wherein said primary angular flange includes a primary flange first extended section extending outwardly therefrom away from the duct and along the structural panel and wherein said corner bracket means is securable thereto to facilitate securement thereof with respect to said primary angular flange.

7. An apparatus for enhancing reinforcing and firestopping around a duct extending perpendicularly through a structural panel as defined in claim 4 wherein said secondary angular flange is oriented approximately perpendicularly with respect to said primary angular flange.

8. An apparatus for enhancing reinforcing and firestopping around a duct extending perpendicularly through a structural panel as defined in claim 5 wherein said corner bracket means comprises;
   A. a first corner panel attachable with respect to said secondary flange first leg of said secondary angular flange;
   B. a second corner panel attachable with respect to said primary flange first leg of said primary angular flange; and
   C. a third corner panel positionable in abutment with respect to said secondary flange second leg of said secondary angular flange.

9. An apparatus for enhancing reinforcing and firestopping around a duct extending perpendicularly through a structural panel as defined in claim 8 further comprising a first corner panel threaded securement means and wherein said first corner panel defines a first corner securement aperture means therein, said first corner panel threaded securement means adapted to extend through said first corner securement aperture means into engagement with said secondary flange first leg thereadjacent.

10. An apparatus for enhancing reinforcing and firestopping around a duct extending perpendicularly through a structural panel as defined in claim 8 wherein said second corner panel of said corner bracket means includes a C-shaped section defining a securement channel means therewithin, said C-shaped section being adapted to extend around said primary flange first leg such that said securement channel means is adapted to receive said primary flange first leg extending therewithin for retaining thereof.

11. An apparatus for enhancing reinforcing and firestopping around a duct extending perpendicularly though a structural panel as defined in claim 8 further comprising a second corner panel threaded securement means and wherein said second corner panel defines a second corner securement aperture means therein, said second corner panel threaded securement means adapted to extend through said second corner securement aperture means into engagement with said primary flange first leg thereadjacent.

12. An apparatus for enhancing reinforcing and firestopping around a duct extending perpendicularly through a structural panel as defined in claim 8 wherein said third corner panel includes marking indicia displayed thereon pointing toward said first corner panel to indicate that the duct should be positioned adjacent said secondary flange first leg inner surface of said secondary flange first leg positioned adjacent said first corner panel.

13. An apparatus for enhancing reinforcing and firestopping around a duct extending perpendicularly through a structural panel as defined in claim 8 wherein said corner bracket means defines a corner slot means extending between said first corner panel and said second corner panel to facilitate adjustable flexibility therebetween to facilitate securement of said first corner panel with respect to said secondary angular flange and securement of said second corner panel with respect to said primary angular flange and abutment of said third corner panel with respect to said secondary flange second leg of said secondary angular flange.

14. An apparatus for enhancing reinforcing and firestopping around a duct extending perpendicularly through a structural panel as defined in claim 1 wherein a corner bracket means is made of metal.

15. An apparatus for enhancing reinforcing and firestopping around a duct extending perpendicularly through a structural panel as defined in claim 1 wherein a corner bracket means is made of steel.

16. An apparatus for enhancing reinforcing and firestopping around a duct extending perpendicularly through a structural panel as defined in claim 4 wherein said primary sealing member and said secondary sealing member are both made of a intumescent paper material.

* * * * *